(12) United States Patent
Weichmann et al.

(10) Patent No.: US 8,837,543 B2
(45) Date of Patent: Sep. 16, 2014

(54) INHIBITING UNAUTHORIZED ACCESS TO A LASER SOURCE

(75) Inventors: Ulrich Weichmann, Aachen (DE); Yuri Aksenov, Leuven (BE)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/977,110

(22) PCT Filed: Jan. 4, 2012

(86) PCT No.: PCT/IB2012/050034
§ 371 (c)(1),
(2), (4) Date: Jun. 28, 2013

(87) PCT Pub. No.: WO2012/093359
PCT Pub. Date: Jul. 12, 2012

(65) Prior Publication Data
US 2013/0272332 A1     Oct. 17, 2013

(30) Foreign Application Priority Data
Jan. 6, 2011   (EP) ..................... 11150279

(51) Int. Cl.
*H01S 3/00* (2006.01)
*B23K 37/00* (2006.01)
*F16P 3/00* (2006.01)

(52) U.S. Cl.
CPC ........... *H01S 3/0007* (2013.01); *B23K 37/006* (2013.01); *F16P 3/00* (2013.01)
USPC ................... 372/38.09; 372/38.02

(58) Field of Classification Search
USPC .......................... 372/38.09, 38.02
See application file for complete search history.

(56) References Cited

U.S. PATENT DOCUMENTS

| 6,055,079 | A | * | 4/2000 | Hagans et al. ................ 398/111 |
| 6,091,749 | A | * | 7/2000 | Hoffmaster et al. ....... 372/38.02 |
| 6,775,398 | B1 | | 8/2004 | Schaeck et al. |
| 7,676,601 | B2 | | 3/2010 | Smith et al. |
| 2007/0001111 | A1 | | 1/2007 | Rueb et al. |
| 2009/0221993 | A1 | * | 9/2009 | Sohi et al. ......................... 606/3 |
| 2009/0241615 | A1 | | 10/2009 | Hansknecht |

FOREIGN PATENT DOCUMENTS

| DE | 4309342 A1 | 9/1994 |
| EP | 0939469 B1 | 5/2005 |
| JP | 6021547 A | 1/1994 |
| JP | 11274608 A | 10/1999 |
| WO | 9907584 A1 | 2/1999 |
| WO | 2007034161 A2 | 3/2007 |

OTHER PUBLICATIONS

R. Devriendt et al, "Laserveiligheid: recente updates", Optische Communicatie 2007-2008, pp. 1-17, XP002671353.

* cited by examiner

*Primary Examiner* — Kinam Park

(57) ABSTRACT

The invention relates to the field of laser sources (3), and for specifically to inhibiting damage due to misuse of a laser source (3), in particular of a high-power laser source (3) provided in a consumer product (1). The proposed device (1) includes at least a laser source (3) and a safety unit (2), wherein by means of the arrangement of the safety unit (2) it is provided that potential harm caused by misuse of the laser source (3) based on an unauthorized access to the laser source (3) is confined or even prevented by reducing the power level of the output of the laser source (3) or by even completely stopping any laser output therefrom. A corresponding method of providing a laser source (3) and a further method of preventing misuse of a laser source (3) are also proposed.

14 Claims, 3 Drawing Sheets

INHIBITING UNAUTHORIZED ACCESS TO A LASER SOURCE

FIELD OF THE INVENTION

The invention relates to the field of laser sources, and for specifically to inhibiting damage due to misuse of a laser source, in particular of a high-power laser source provided in a consumer product.

BACKGROUND OF THE INVENTION

Laser technology is used in multiple areas, including pointing devices, optical data storage, bar code scanning, three-dimensional scanning, digital projection of images, and cutting or engraving of material. In some of these areas, due to the purpose of the laser, the laser beam used is confined to an interior of the respective product, whereas in other cases, a laser beam exits the device (e.g. in the case of a laser pointer or with a digital image projection).

In particular depending on the power of a laser beam, there is a danger of harming the health of people or animal, e.g. damaging the eyes or even the skin, or of damaging objects.

In U.S. Pat. No. 7,676,601 B1 there is proposed a laser safety system for checking the presence, focus and integrity of a laser beam focusing lens and other components of a laser system, in order to increase the safety of people and objects from accidental exposure to the laser beam. U.S. Pat. No. 7,676,601 B1 suggests providing an alarm or disabling the laser source in case of recognition of an abnormal condition being detected.

However, there are reports on using commercially available laser pointers for disturbing a goalkeeper during a soccer match, wherein a similar disturbing of aircraft pilots during take-off or landing might even cause a catastrophic accident.

While systems like the one of U.S. Pat. No. 7,676,601 B1 may increase the general safety of using laser technology in the intended context, there is still a possibility of willfully mis-using a laser source for a purpose not originally intended.

With lasers more and more entering the field of digital projection of images, the requirements of brightness result in consumer products including laser sources with an output up to several 10 W of power, wherein an abuse of such laser sources poses a severe threat.

SUMMARY OF THE INVENTION

It is an object of the present invention to reduce the danger involved with attempts of abusing a laser source outside its intended context.

In a first aspect of the present invention a device is presented, the device comprising a laser source and a safety unit, wherein the safety unit is adapted for causing, upon unauthorized access to the laser source, a rendering of the laser source inoperable, or a reduction of the outputtable power of the laser source.

It was found by the inventors of the present invention that—in order to avoid or at least mitigate detrimental effects of a potential misuse of a possibly dangerous laser equipment—it is not necessary to prevent in general unauthorized access to the laser equipment or to the laser source, if measures are provided for reducing the danger of the laser source, wherein such reduction of danger of the laser source may be provided by disabling the laser source (preferably permanently, alternatively to such an extent that repair becomes unreasonable) or by reducing the power of the laser beam, which may be outputted therefrom.

In case the laser source becomes available to unauthorized access, i.e. in case there is a possibility of the breach of security measures provided for the usual and intended use of the laser source, the device including the laser source is by means of the safety unit adapted for at least partially corrupting the laser source to such an extend that the danger resulting therefrom, e.g. a danger to the user himself who accidentally misuses the laser source or a danger to a third party in case of misuse in general, is reduced and preferably eliminated.

The device according to the invention includes at least a laser source and a safety unit, wherein by means of the arrangement of the safety unit it is provided that potential harm caused by misuse of the laser source based on an unauthorized access to the laser source is confined or even prevented by reducing the power level of the output of the laser source or by even completely stopping any laser output therefrom.

In one preferred embodiment, the device further comprises an interface to the outside of the device, wherein the interface is adapted for providing an authorizing action for preventing the safety unit from causing the rendering and/or the reduction, thus allowing for authorized access to the laser source. The device according to this embodiment allows for differentiating between an authorized access and an unauthorized access in response to an input from the exterior, thus making it possible to perform maintenance or service, for example, with access to the laser source without triggering the safety unit. Nevertheless, it is to be noted that the present invention may also be implemented in a way that there is no authorized access to the laser source anymore and any access is considered as being unauthorized.

In a particular embodiment, the interface comprises a user interface adapted for accepting a user input, wherein the interface is adapted for providing the authorizing action in case the user input corresponds to a predetermined access code. One possibility for allowing external access with authorization is the input of a code, password or other data validating the authorization. Involved with such user input may be additional processing, as it is known in the context of passwords and similar means for access control.

In another particular embodiment, the interface is adapted for being coupled to an external authorizing device, wherein the interface is adapted for providing the authorizing action in case the external authorizing device provides the interface with a predetermined access code. As an alternative or in addition to the particular features of the above embodiment, it is also possible to grant authorized access to the laser source upon presentation of a separate authorizing device, e.g. a dongle or a simple key, which gives the additional advantage of a larger versatility with respect to routines for verifying the authorization device.

In a further particular embodiment, the authorizing action includes outputting an authorizing code from the interface to the safety unit. The safety unit is adapted for, prior to causing the corruption of the laser source, checking whether or not an access is authorized or unauthorized. Such check may additionally include further data exchange between the safety unit and the interface.

In yet a further particular embodiment, the authorizing action includes temporarily deactivating the safety unit, temporarily removing the laser source from an area of influence of the safety device and/or temporarily limiting the area of influence to exclude the laser source therefrom. As indicated here, the authorizing action does not necessarily imply that there is any active response or reaction by the safety unit to such action, as the safety unit may also be prevented from corrupting the laser source as a direct result of the authorizing action without further involvement of the safety unit itself.

In another preferred embodiment, the safety unit is adapted for causing, upon any access to the laser source, a rendering of the laser source inoperable, or a reduction of the outputtable power of the laser source. As indicated above, the present invention is not limited to cases in which there has to be the possibility for also authorized access to the laser source.

In yet a further embodiment, the safety unit comprises a detector for detecting access to the laser source. While the safety unit may be provided for passively preventing unauthorized (or even any) access to the laser source (e.g. by arranging the laser source and the safety unit mechanically or electrically in such a way that the access not to be allowed itself causes a destruction of the laser source), the protection provided may alternatively or additionally be based on an active recognition of an access to the laser source.

In a particular embodiment, the device further comprises a housing and/or a structural support for the laser source, wherein the detector is adapted for detecting access to the laser source by detecting an opening of the housing and/or a disconnection of the laser source from the structural support. A particular example of the active recognition of an access includes checking for the housing including the laser source being closed and/or for the presence of a connection of the laser source to an element of the device normally supporting the laser source.

In yet another preferred embodiment, the safety unit is adapted for rendering the laser source inoperable by inputting a destructive voltage and/or current to the laser source. As laser sources, in particular laser diodes, are to be operated under certain conditions, voluntarily not meeting such conditions in a destructive way allows for disabling the laser source permanently without a need for a complete re-design of the laser source and/or its control circuitry.

In a further preferred embodiment, the safety unit is adapted for, upon rendering the laser source inoperable, destroying the laser source. In addition or as an alternative from just preventing that the laser source is operated in its normal way, the present embodiment provides for structurally damaging the laser source itself.

In a particular embodiment, the safety unit is adapted for mechanically and/or chemically destroying the laser source. Possibilities for destroying the laser source include breaking, bending or cutting at least an integral part of the laser source to destroy it, wherein the destruction may also be provided chemically, e.g. by etching the laser source or at part thereof.

In yet a further preferred embodiment, the safety unit is adapted for rendering the laser source inoperable and/or reducing the outputtable power of the laser source by opaquing and/or blocking an output path of a laser light of the laser source. It was found to be sufficient to prevent or at least reduce the output of the laser light, as a laser source of reduced output or even prevented output may cause less damage.

In a further aspect of the present invention method of providing a laser source is presented, wherein the method comprises a step of providing a safety unit, wherein the safety unit is adapted for causing, upon unauthorized access to the laser source, a rendering of the laser source inoperable, or a reduction of the outputtable power of the laser source.

In yet a further aspect of the present invention a method of preventing misuse of a laser source is proposed, the method including a step of causing, upon unauthorized access to the laser source, a rendering of the laser source inoperable, or a reduction of the outputtable power of the laser source.

It shall be understood that the device of claim 1, the method providing a laser source of claim 14 and the method of preventing misuse of a laser source of claim 15 have similar, corresponding and/or even identical preferred embodiments as defined in the dependent claims.

It shall be understood that a preferred embodiment of the invention can also be any combination of any of the dependent claims with the respective independent claim.

These and other aspects of the invention will be apparent from and elucidated with reference to the embodiments described hereinafter.

DETAILED DESCRIPTION OF EMBODIMENTS

Figure 1:
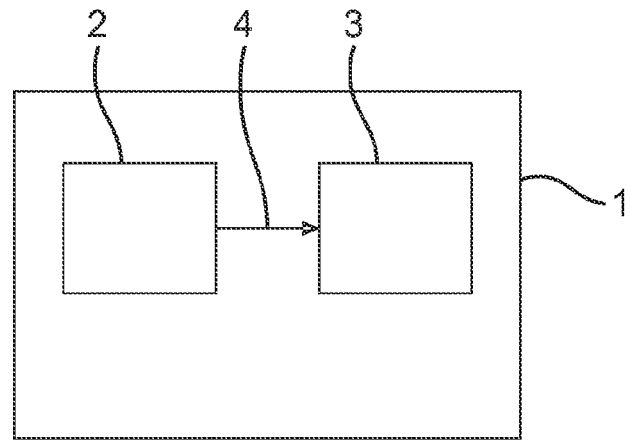
FIG. 1 shows schematically a device according to a first exemplary embodiment of the present invention.

FIG. 1 shows schematically a device 1 according to a first exemplary embodiment of the present invention. The device 1 is an image projecting device including a laser source 3, wherein the image projecting device 1 further includes a safety unit 2. The safety unit 2 in this embodiment is adapted for causing, upon unauthorized access to the laser source, a rendering of the laser source inoperable. In other words, the safety unit 2 is able to effect on the laser source 3 (as illustrated by arrow 4) and its operability. In the present example, the laser source 3 is constituted by a laser diode, wherein the safety unit 2 is able to provide a voltage of reverse polarity to the laser source 3 for permanently disabling the laser source 3. Accordingly, in the embodiment of FIG. 1, if there is any access to the laser source (without authorization any access is considered to be unauthorized), the safety unit 2 will provide a sufficiently large reverse voltage, thus disabling the laser source 3 and thus preventing a misuse of the laser source 3, which otherwise might have been possible to the unrestricted access to the laser source 3.

Figure 2:
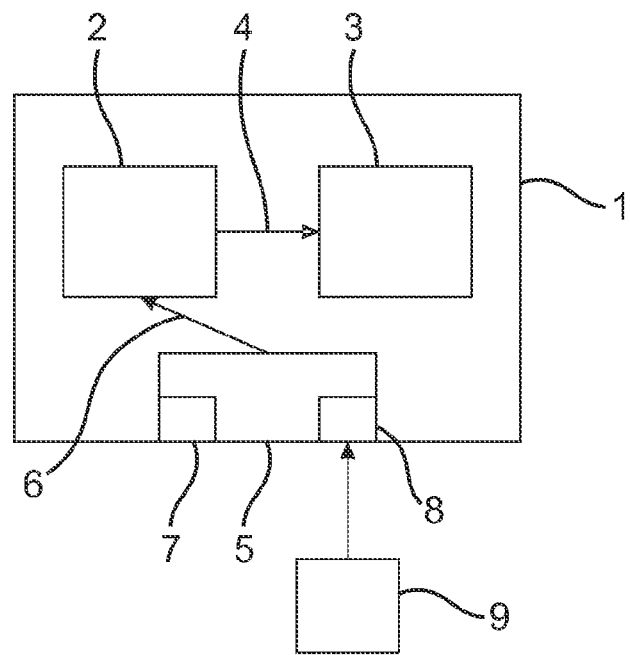
FIG. 2 shows schematically a device according to a second exemplary embodiment of the present invention.

FIG. 2 shows schematically a device 1 according to a second exemplary embodiment of the present invention. The basic structure of device 1 of this embodiment largely corresponds to that of the embodiment of FIG. 1, wherein furthermore device 1 of the second exemplary embodiment includes an interface 5. The interface 5 is provided with a user interface 7 for accepting a user input and an external device interface 8 for coupling an external authorizing device 9. As in the case of the embodiment illustrated in FIG. 1, the safety unit 2 is adapted for effecting the laser source 3 (also indicated by arrow 4). In this embodiment however, the safety unit 2 is adapted for reducing the output power of the laser source 3 by applying an opaquing agent to an output path of the laser source 2 in case of an unauthorized access to the laser source 2. Furthermore, however, differing from the embodiment of FIG. 1, the interface 5 allows for an authorizing input, either by means of the user interface 7 provided by a user or by means of the authorizing device 9 coupled to the external device interface 8. If such authorizing input is provided, the interface takes an authorizing action (indicated by arrow 6) to the safety unit 2 and thereby prevents the safety unit 2 from being triggered.

In a differing embodiment, the interface requests a correct authorizing input from both, the user interface and the external device interface in order to confirm an access as an authorized access.

Figure 3:
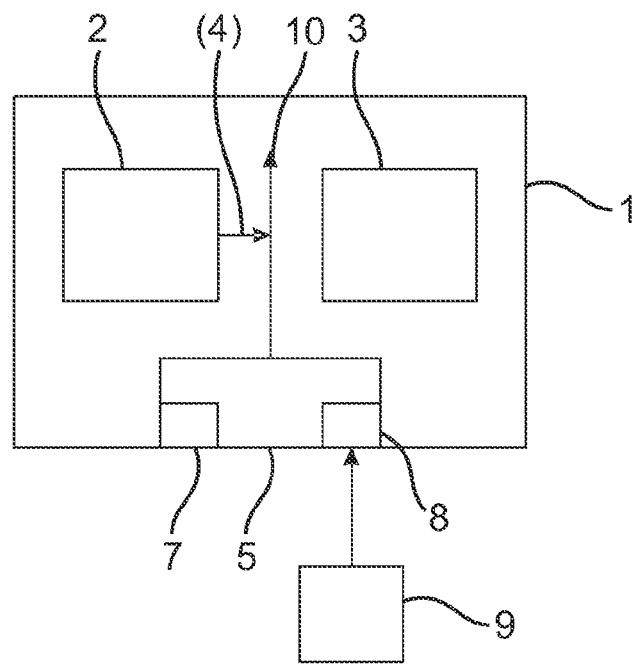
FIG. 3 shows schematically a device according to a third exemplary embodiment of the present invention.

FIG. 3 shows schematically a device 1 according to a third exemplary embodiment of the present invention. Similar to the device of FIG. 2, the device 1 of the present embodiment includes a safety unit 2, a laser source 3 and an interface 5 with a user interface 7 and an external device interface 8, which is adapted for being coupled with an external device like authorizing device 9. Deviating from the embodiment of FIG. 2, the present safety unit 2 is adapted for mechanically destroying the laser source 3 by releasing a spring loaded pin (not shown) for perforation and thus destroying the laser source 3. Furthermore, the interface 5, upon receiving concurring authorizing inputs from the user (via user interface 7) and the external device 9 (via external device interface 8), is adapted for taking an authorizing action by independently blocking the spring loaded bin (illustrated by arrow 10), so the spring loaded pin is not actually not released (indicated by the arrow indicated by (4)). Otherwise, the operation of the embodiment of FIG. 3 corresponds to that of the embodiment of FIG. 2.

Figure 4:
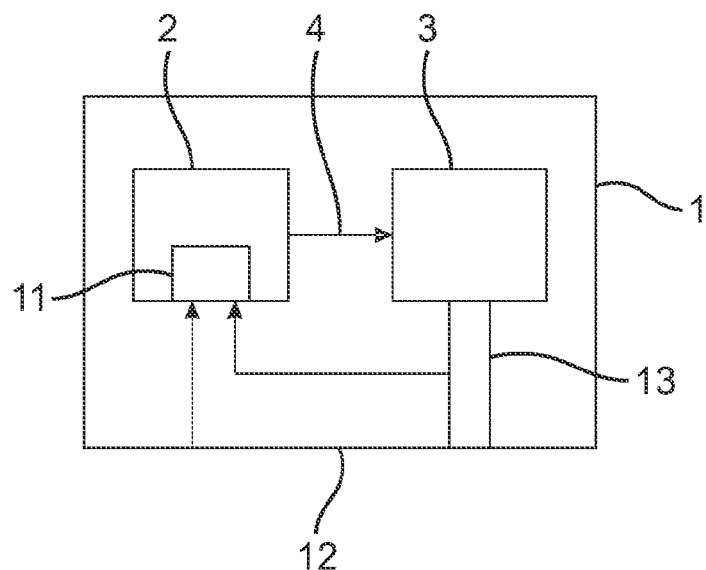
FIG. 4 shows schematically a device according to a forth exemplary embodiment of the present invention.

FIG. 4 shows schematically a device 1 according to a forth exemplary embodiment of the present invention. Similar to the previously illustrated and discussed embodiments, the device 1 includes a safety unit 2 and a laser source 3. In addition, the device comprises a housing 12 enclosing the laser source 3 and a structural support 13 for the laser source 3. By means of the structural support 13, the laser source 3 is fixed inside the device 1. Furthermore, the safety unit 2 includes a detector 11, which is adapted for detecting an opening of the housing 12 and the intact connection between the laser source 3 and the support 13. The detection of an opening of the housing 12 or the disconnection of the laser source 3 from the support 13 is in this embodiment considered as an unauthorized access which causes the safety unit 2 to render the laser source 3 permanently inoperable (see above, arrow 4). A combination of the detection of an opening of the housing 12 and a disconnection of the laser source 3 from the support 13 give the following advantage: The sensitivity of the detector as to an opening of the housing 12 may be limited to such an extent that any opening allowing for passing therethrough the laser source 3 together with the support 13 is detected. If the laser source 3 is not disconnected from the support 13, such sensitivity ensures that the laser source 3 may not be removed from the housing 12. If however, the laser source 3 is disconnected from the structural support 13, this event triggers the detection, regardless of whether or not the housing 12 is opened. Due to the detection of the opening of the housing 12, an unauthorized access including the removal of the laser source 3 together with the support 13 is also either prevented or detected.

Figure 5:
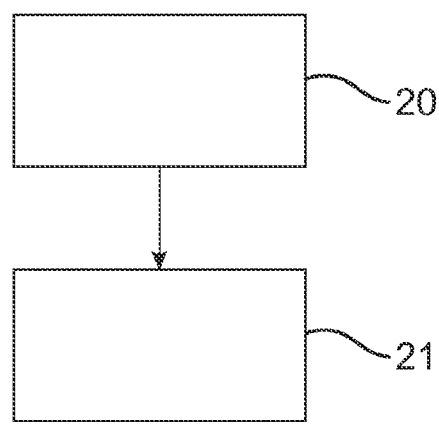
FIG. 5 shows a flowchart schematically illustrating an exemplary embodiment of a method of providing a laser source according to the present invention.

FIG. 5 shows a flowchart schematically illustrating an exemplary embodiment of a method of providing a laser source according to the present invention. In addition to the mere providing 20 of a laser source, the method further includes the additional step 21 of providing a safety unit, e.g. one as discussed above, wherein the safety unit is adapted for causing, upon unauthorized access to the laser source, a rendering of the laser source inoperable, or a reduction of the outputtable power of the laser source. It is to be noted that the order of these steps may also be reversed.

Figure 6:
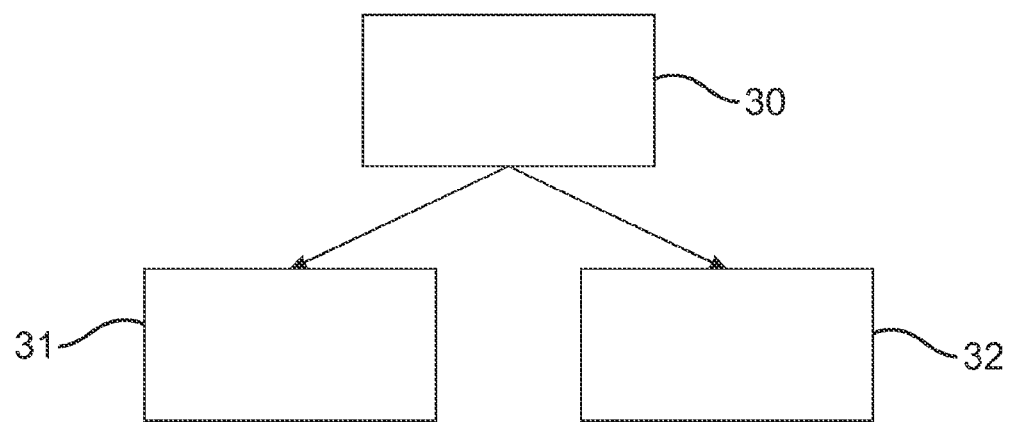
FIG. 6 shows a flowchart schematically illustrating an exemplary embodiment of a method of preventing a misuse of laser source according to the present invention.

FIG. 6 shows a flowchart schematically illustrating an exemplary embodiment of a method of preventing a misuse of laser source according to the present invention. Upon detecting unauthorized access at a laser source (step 30), at least one of the steps of a rendering of the laser source inoperable (step 31), or a reduction of the outputtable power of the laser source (step 32) is caused.

It is to be noted that the detection of the unauthorized access and the corresponding safety measure are indeed intrinsically connected, i.e. that the unauthorized access itself directly causes or performs the safety measure. In other words, the triggering of the safety measure may be understood indeed as a detection of the unauthorized access.

Although in the above described embodiments the device including the laser source is described as a projector for digital images, the device can also be another device including a laser source, e.g. a laser cutting or laser engraving device.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The device proposed and described herein includes at least a laser source and a safety unit, wherein by means of the arrangement of the safety unit it is provided that potential harm caused by misuse of the laser source based on an unauthorized access to the laser source is confined or even prevented by reducing the power level of the output of the laser source or by even completely stopping any laser output therefrom. A corresponding method of providing a laser source and a further method of preventing misuse of a laser source are also proposed and described herein.

Lasers may be dangerous devices that can easily cause eye or even skin damage. To ensure safety, lasers in consumer products are mostly of laser class 1 or in certain cases of class 2. The most common lasers in consumer products are in CD/DVD/BluRay-drives for optical storage, where no access to the laser beam is possible without opening the device.

The situation is different for laser pointers, where the light of the laser should be seen. Here the laser power should be kept to such a low level that the device is still within laser class 1 or 2.

Misuse of lasers is dangerous. With the growing availability of lasers in consumer products, potential misuse has to be taken into account. One example for such misuse has been reported from soccer games, where fans of one team used laser pointers to disturb the goalkeeper of the other team. Even worse are cases, where aircraft pilots are disturbed in a similar way while starting or landing, which could lead to really catastrophic accidents.

With more and more powerful laser sources becoming available, just by dismantling a product, such a laser source is provided and the danger of potential misuse and the possible impact of such misuse is increasing. Quite recently a laser projector with more than 20 W of laser power has been brought to the market and already now a high power laser pointer exceeding any safety limitations that makes use from the components of the laser projector is offered via the internet. Indeed, currently lasers increasingly enter the field of digital projection, where the brightness requirements of several 1000 lm on the screen directly lead to several 10 W of installed laser power in the projector. Emitting a collimated beam with just 1 W of laser power at blue wavelengths, easily laser safety class 4 is reached, wherein misuse of such laser might pose a major threat to public safety.

In the present application, measures are proposed that help preventing or at least mitigating misuse of the components of laser devices. An example of such measures is discussed above, and includes providing a destruction unit as an example of a safety unit, an interlock as an example of a interface and a key to prevent the destruction unit from being activated upon accessing the laser source. Only authorized persons can use the key to override the destruction arrangement and can therefore access the laser source, e.g. for doing service. Unauthorized people who are not in possession of the key will not be able to access the laser without activating the destruction unit. This will lead to destruction of the laser source, which is therefore no longer available for misuse.

In the present application the use of safety measures in particular for consumer devices containing potentially dangerous lasers is discussed that does not allow unauthorized access to the lasers without either destroying them or reducing the laser power to a less dangerous level.

The destruction unit addressed above serves to destroy the laser diodes of the laser source and can be implemented in several ways: It can for example be of electric nature and may cause an excessive reverse voltage in order to destroy the diodes. A possible implementation of such example could be a capacitor that is discharged over the laser diodes when the destruction unit is activated. Another implementation could be an explosive that is triggered for spraying a paint or enamel over the laser diodes so that their window is getting opaque or blocked. Further measures to destroy the diodes can easily be thought of and the above list of example is not exhaustive.

The key for allowing authorized access can also be of diverse nature: One possible implementation is a number code that can be supplied to the exemplary projector device before opening it. Another one example is a dongle device with the appropriate key securely stored to it. Other alternatives are also feasible, wherein it is even possible not to provide any access to the laser source at all, so any attempt of tampering with the laser source results in the laser source rendered inoperable or being at least reduced in power.

The invention relates to the field of laser sources, and for specifically to inhibiting damage due to misuse of a laser source, in particular of a high-power laser source provided in a consumer product. The proposed device includes at least a laser source and a safety unit, wherein by means of the arrangement of the safety unit it is provided that potential harm caused by misuse of the laser source based on an unauthorized access to the laser source is confined or even prevented by reducing the power level of the output of the laser source or by even completely stopping any laser output therefrom. A corresponding method of providing a laser source and a further method of preventing misuse of a laser source are also proposed.

The invention claimed is:

1. A device comprising
a laser source and
a safety unit,
wherein the safety unit comprises a detector for detecting (30) unauthorized access to the laser source, and the safety unit is adapted for causing, upon unauthorized access to the laser source,
a rendering of the laser source inoperable, or
a reduction of the outputtable power of the laser source such that the laser source is permanently disabled.

2. The device according to claim 1, further comprising
an interface (5) to the outside of the device,
wherein the interface is adapted for providing an authorizing action for preventing the safety unit from causing the rendering and/or the reduction, thus allowing for authorized access to the laser source.

3. The device according to claim 2,
wherein the interface comprises a user interface adapted for accepting a user input, wherein the interface is adapted for providing the authorizing action in case the user input corresponds to a predetermined access code.

4. The device according to claim 2,
wherein the interface is adapted for being coupled to an external authorizing device, wherein the interface is adapted for providing the authorizing action in case the external authorizing device provides the interface with a predetermined access code.

5. The device according to claim 2,
wherein the authorizing action includes outputting an authorizing code from the interface to the safety unit.

6. The device according to claim 2,
wherein the authorizing action includes temporarily deactivating the safety unit, temporarily removing the laser source from an area of influence of the safety device and/or temporarily limiting the area of influence to exclude the laser source therefrom.

7. The device according to claim 1,
wherein the safety unit is adapted for causing, upon any access to the laser source,
a rendering of the laser source inoperable, or
a reduction of the outputtable power of the laser source.

8. The device (1) according to claim 1,
further comprising
a housing and/or a structural support for the laser source,
wherein the detector is adapted for detecting access to the laser source by detecting an opening of the housing and/or a disconnection of the laser source from the structural support.

9. The device according to claim 1,
wherein the safety unit is adapted for rendering the laser source inoperable by inputting a destructive voltage and/or current to the laser source.

10. The device according to claim 1,
wherein the safety unit is adapted for, upon rendering the laser source inoperable, destroying the laser source.

11. The device according to claim 1,
wherein the safety unit is adapted for mechanically and/or chemically destroying the laser source.

12. The device according to claim 1,
wherein the safety unit is adapted for rendering the laser source inoperable and/or reducing the outputtable power of the laser source by opaquing and/or blocking an output path of a laser light of the laser source.

13. A method of providing a laser source, including
a step of providing a safety unit with a detector for detecting unauthorized access to the laser source, wherein the safety unit is adapted for causing, upon unauthorized access to the laser source,
a rendering of the laser source inoperable, or
a reduction of the outputtable power of the laser source such that the laser source is permanently disabled.

14. A method of preventing misuse of a laser source, including
a step of detecting by means of a detector unauthorized access to the laser source
a step of permanently disabling the laser source upon unauthorized access to the laser source by means of
a rendering of the laser source inoperable, or
a reduction of the outputtable power of the laser source.

* * * * *